United States Patent [19]

Gottlieb et al.

[11] 4,362,057

[45] Dec. 7, 1982

[54] OPTICAL FIBER TEMPERATURE SENSOR

[75] Inventors: Milton Gottlieb, Churchill; Gerald B. Brandt, Edgewood, both of Pa.

[73] Assignee: Electric Power Research Institute, Inc., Palo Alto, Calif.

[21] Appl. No.: 195,911

[22] Filed: Oct. 10, 1980

[51] Int. Cl.³ ............................................... G01K 1/00
[52] U.S. Cl. .......................................... 374/4; 356/44; 374/111; 374/123; 374/152
[58] Field of Search ........................ 73/339 R, 355 R; 356/43, 44

[56] References Cited

U.S. PATENT DOCUMENTS

| | | | |
|---|---|---|---|
| 4,151,747 | 5/1979 | Gottlieb et al. | 73/339 R |
| 4,203,326 | 5/1980 | Gottlieb et al. | 73/339 R |
| 4,302,970 | 12/1981 | Snitzer et al. | 73/339 R |

Primary Examiner—Donald O. Woodiel
Attorney, Agent, or Firm—M. P. Lynch

[57] ABSTRACT

The self-generating thermal radiation properties of an optical fiber element are employed to determine the temperature, location and length of a hot spot, or region, of an object.

7 Claims, 12 Drawing Figures

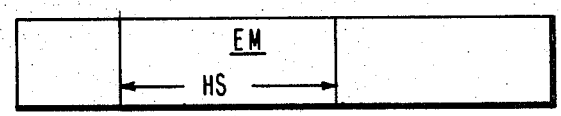
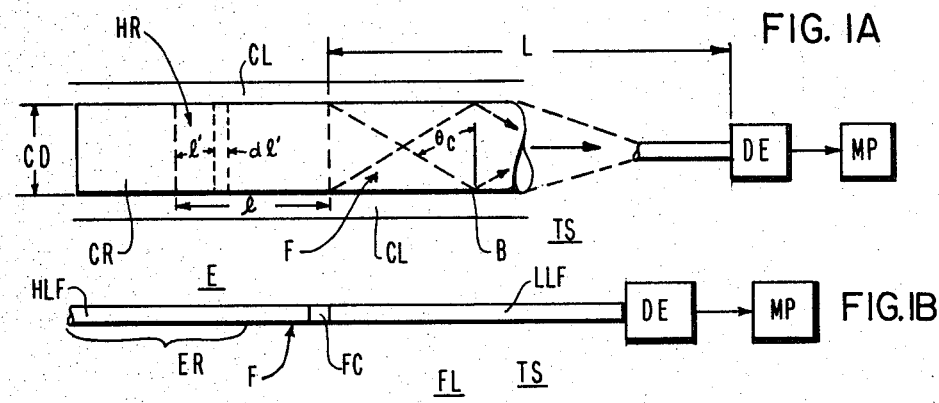
FIG. IA
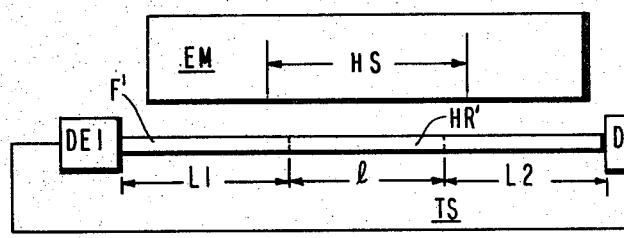
FIG. IB
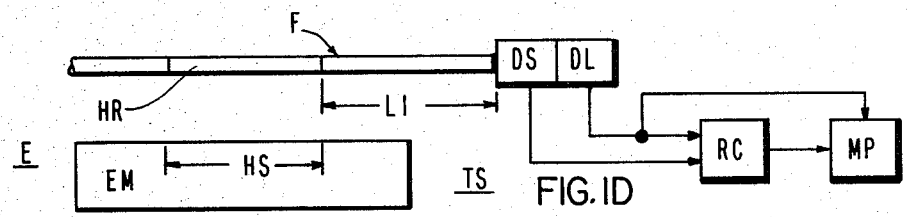
FIG. IC
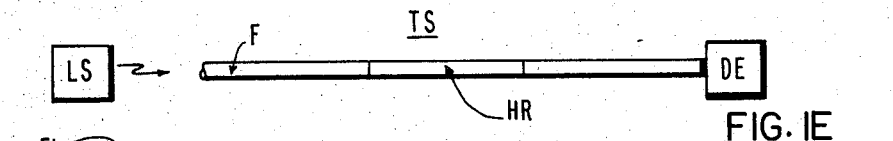
FIG. ID
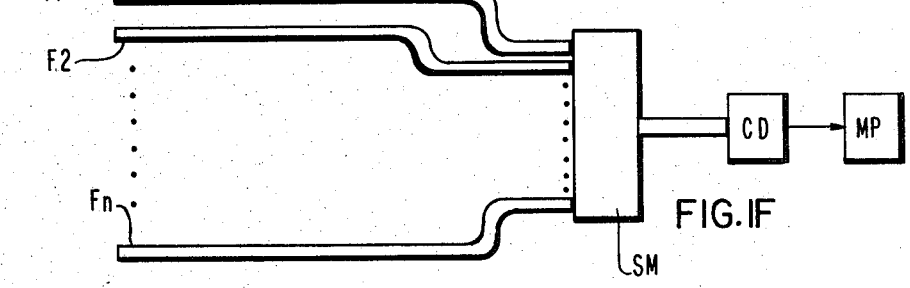
FIG. IE
FIG. IF

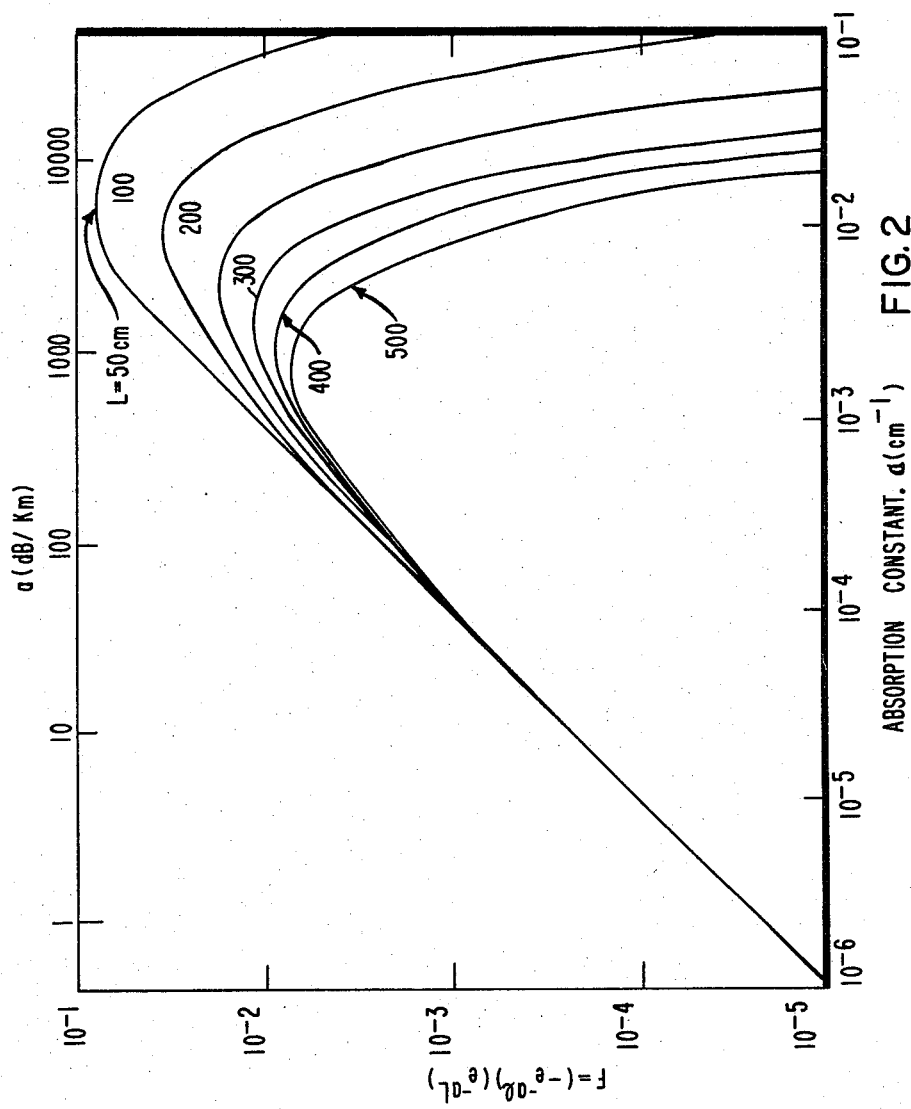

OPTICAL FIBER TEMPERATURE SENSOR

BACKGROUND OF THE INVENTION

While it is a critical requirement in the operation of electrical machinery, such as generators and transformers, to monitor the development of hot spots, or regions, in order to avoid equipment failure, measuring techniques employed to date have suffered due to their sensitivity to ambient, thermal and magnetic conditions, as well as the difficulty in gaining access to the equipment by conventional methods.

SUMMARY OF THE INVENTION

There is disclosed herein with reference to the accompanying drawing a novel technique employing an optical fiber made of conventional fiber materials to determine the location, length and temperature of a hot region anywhere along the length of the fiber.

The technique is based on the observation that all materials, when heated, will emit thermal radiation, in an amount dependent on the temperature, emissivity of the fiber material, and the spectral range of wavelength being observed. For perfectly transparent material, the emissivity is zero, and no thermal radiation is produced. However, even highly transparent materials, such as glasses that are used to make optical fibers, have a finite emissivity in the near infrared, where thermal radiation for the temperature range from about 100° C. to 1000° C. is relatively pronounced. Furthermore, glasses such as silica transmit relatively well to wavelengths near 4 microns, thus rendering the material responsive to relatively low temperatures, wherein the response can be detected at the end of the fiber.

The use of optical fibers in temperature sensing applications are described in U.S. Pat. Nos. 4,151,747 and 4,203,326 which were issued to the present inventors and incorporated herein by reference.

In the conventional application of optical fibers to pyrometry the function of the fiber is simply to transmit an optical signal which is introduced into one end of the fiber to the other end. In the technique disclosed herein, thermal radiation is self-generated within the fiber itself, so that if the fiber is in thermal equilibrium with its surroundings, determining the fiber temperature from its radiation characteristics will serve to determine the temperature of the surroundings as well. For a relatively long length of a fiber element, thermal radiation will emanate from all portions of the fiber, which may be at widely different temperatures, and therefore emit radiation of greatly different spectral composition. However, the total power radiated at all wavelengths increases very dramatically with increasing temperature so the spectral composition detected at the end of the fiber element will be essentially determined by the highest temperature along the fiber, and will be largely independent of the length of the hot region. Thus, this fiber element configuration is well suited for hot-spot, or region, detection of an object where it may be of little importance to know where along the fiber the hot region of the object has occurred. While the specific embodiment discussed defines the monitored object to be electrical machinery, the object being monitored by the elongated optical fiber temperature sensor may be gas or fluid environment.

Numerous material selections are available, and numerous physical configurations can be employed to meet a given application. The material selection for the fiber can be such that the spectral transmission of the material will provide optimum performance of the hot spot detector for a preferred temperature range and fiber length.

DESCRIPTION OF THE DRAWINGS

The invention will become more readily apparent from the following exemplary description in connection with the accompanying drawings:

FIGS. 1A–1E are schematic illustrations of an optical fiber hot spot detector embodiments employing the invention;

FIGS. 2–7 are graphical illustrations of the operation of the detector concept of FIGS. 1A–1E.

DESCRIPTION OF THE PREFERRED INVENTION

Figure 3:
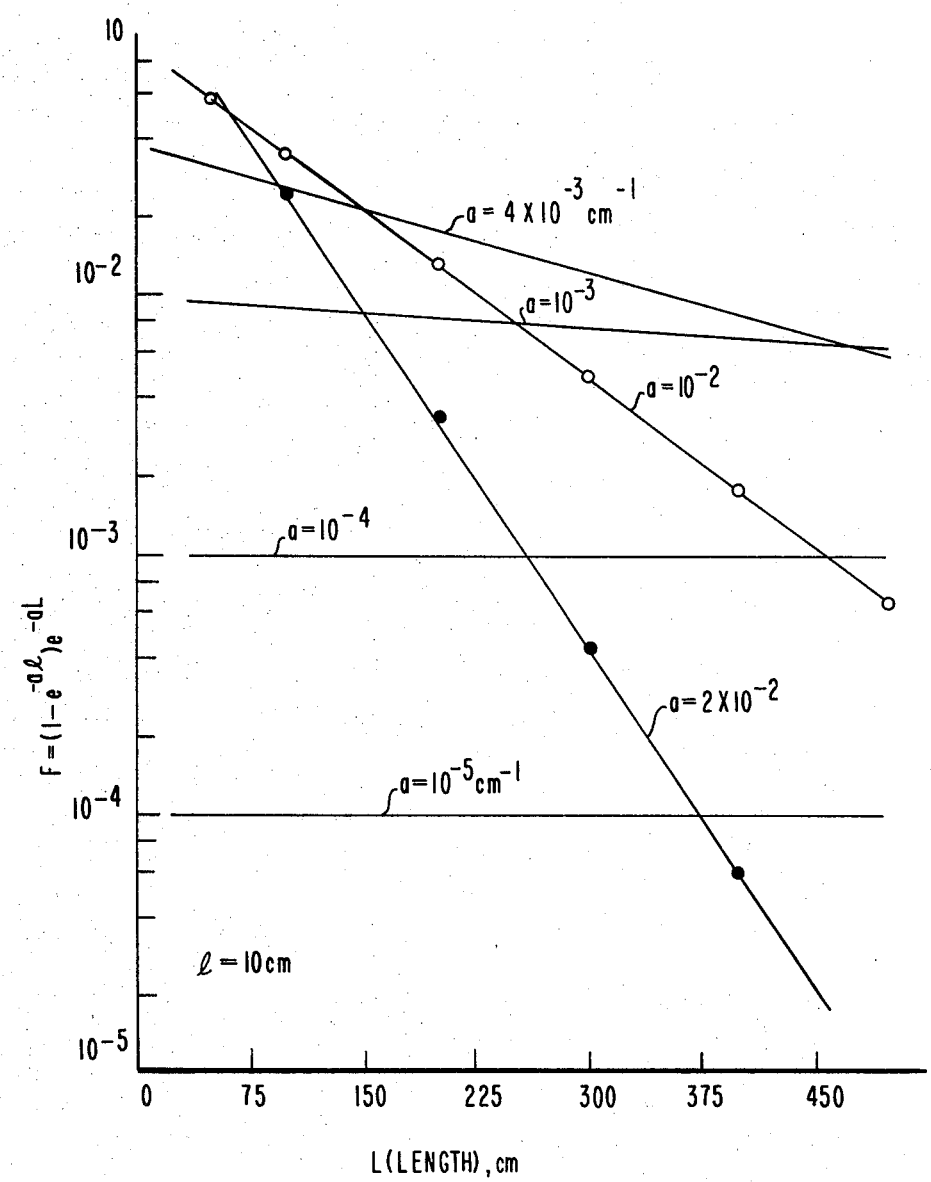

An analysis of the operation of a temperature sensing fiber device TS in accordance with this invention can be made on the basis of the well-known theory of black body radiation and the light guiding properties of optical fibers. A schematic of an optical fiber F in which there is a high temperature region HR emitting thermal radiation in response to a corresponding hot region HS of an adjacent object EM, i.e. electrical machinery, is shown in FIG. 1A. As indicated above, the optical fiber F does not merely transmit radiation from a glowing, opaque surface, but rather the fiber F becomes, in effect, a black body cavity whose temperature can be determined. Among the advantages of this type of sensor, are the distributed sensitivity of the optical fiber F, i.e., the temperature of a hot spot, or region, located anywhere along the optical fiber F can be determined. No light source is required since only thermal radiation is detected.

The total power density radiated from the surface of a heated body, between the wavelengths $\lambda_o$ and $\lambda_f$ is:

$$P = \int_{\lambda_o}^{\lambda_f} \epsilon(\lambda, T) \frac{C_1}{\lambda^5}\left[e^{\frac{C_2}{\lambda T}} - 1\right]^{-1} d\lambda \ \text{watts/cm}^2 \quad (1)$$

where the emissivity, $\epsilon$, may be a function of both wavelength, $\lambda$, and temperature, $T$, and $C_1 = 3.741 \times 10^{-12}$ watts/cm$^2$ $C_2 = 1.439$ cm °K.

The emissivity, and the fraction of total emitted radiation guided down the optical fiber F is readily determined by a commercially available microprocessor circuit MP in accordance with equation (1) above.

The optical fiber F of FIG. 1A consists of a fiber core CR surrounded by a fiber clad CL. Typically, the fiber core CR may be quartz or borosilicate glass while the cladding CL may typically be plastic or air.

The temperature of the ambient environment E surrounding the optical fiber F results in thermal radiation emanating from all portions of the fiber F. Only the radiation that is emitted in such a direction that strikes the boundary B of the core CR of the fiber F at angles greater than the critical angle, $\theta_c$, will be guided by the fiber F to an optical detector DE, located at one end of the fiber F. The optical detector DE, which may typically be a silicon or germanium photodiode, converts the optical thermal radiation energy into an equivalent electrical signal. Radiation incident at smaller angles than the critical angle will escape from the fiber F. The output signal of the detector DE can be used for display or control purposes or can be supplied to the microprocessor circuit MP for processing in accordance with a predetermined mathematical expression.

THEORY OF OPERATION

The contribution to the radiation power from a thin slab of material of a thickness $dl'$, of FIG. 1A, is:

$$dP = \alpha W D dl'$$

where $\alpha$ is the absorption, or loss, constant and W is the integral of the planck function, $$\int_0^\infty \frac{C_1}{\lambda^5}\left[e^{\frac{C_2}{\lambda T}} - 1\right]^{-1} d\lambda.$$

If this radiation must travel a distance $l'$ to the end of the hot region HR, then some of this radiation will be absorbed, and remaining radiation will be represented as follows:

$$dP = \alpha W e^{-\alpha l'} dl.$$

The total power density from the entire hot region HR of length $l$ is $$P = \int_0^l W e^{-\alpha l'} dl' = W(1 - e^{-\alpha l}) \quad (2)$$

The emissivity is, by definition, the factor by which the planck integral is multiplied to get the total radiated power density, $$\epsilon = (1 - e_{-\alpha l}) \quad (3)$$

In the usual optical fiber situation, with a localized hot region, $$\alpha l << 1$$

and $$\epsilon \approx \alpha l, \quad (4)$$

so that the emissivity increases linearly with the length of the hot region HR. In the other extreme, where $$\alpha l >> 1, \epsilon \approx 1,$$

and the total radiation is independent of the extent of the hot region HR, the optical fiber behaves essentially as a black-body cavity. Since the absorption constant must be non-negligible, i.e., relatively high loss, in order for thermal radiation to be generated, the signal will be attenuated in the cool length KL of the optical fiber F between the hot spot HR and the detector DE, by the factor $$e^{-\alpha L},$$

where L is the distance between the hot spot HR and the detector DE. Thus, the choice of the absorption constant will be dictated by a selected combination of the above factors. Only the radiation that is emitted in such a direction that strikes the boundary B of the core CR of the fiber F at angles greater than the critical angle, $\theta_c$, will be guided by the optical fiber F to the detector DE. Radiation incident at angles smaller than the critical angle will escape from the optical fiber F. The critical angle, determined by the refractive indices n of the core CR and the cladding CL, is $$\theta_c = \sin^{-1} \frac{n_{clad}}{n_{core}} \quad (5)$$

and the fraction of the total radiation that falls within the angular aperture of the fiber F is shown to be equal to:

$$1 - \sin \theta_c = 1 - \frac{n_{clad}}{n_{core}}. \quad (6)$$

Taking into account all the above factors, assuming an optical fiber F wherein the diameter D of the core CR corresponds with core diameter CD, the total radiant power propagated down the fiber F in the wavelength interval $\lambda_o$ to $\lambda_f$ is $$P = \left(\frac{\pi D^2}{4}\right)\left(1 - \frac{n_{clad}}{n_{core}}\right)(1 - e^{-\alpha l})e^{-\alpha l} \int_{\lambda_o}^{\lambda_f} \frac{C_1}{\lambda^5}\left[e^{\frac{C_2}{\lambda T}} - 1\right]^{-1} d\lambda \text{ watts}, \quad (7)$$

where for simplicity, it is assumed that $\alpha$ is not a function of wavelength over the range $\lambda_o$ to $\lambda_f$, and is thus removed from the integral expression above. The wavelength range will depend upon the detector DE employed, and to be more precise, the integrand should be multiplied by the spectral response function of the detector DE. For the purposes of discussion, it will be assumed that the spectral response is flat. The detector DE can be conveniently implemented through the use of a silicon or germanium photodiode, with long wavelength cut-offs of 1.0 micron and 1.8 microns, respectively. For low temperature applications, a lead sulfide detector can be employed, which has a long wavelength cut-off of 2.9 microns. The significant effects of temperature and long wavelength cut-off, $\lambda_c$, on the black body radiation function where the above typical detector materials are employed is apparent from Table 1.

TABLE I

| | BLACK BODY RADIATION POWER | | |
|---|---|---|---|
| T | $P(\lambda_c = 1 \mu m)^{w/cm2}$ | $P(\lambda_c = 1.8 \mu m)^{w/cm2}$ | $P(\lambda_c = 2.9 \mu m)^{w/cm2}$ |
| 100° C. | $2.8 \times 10^{-14}$ | $1.17 \times 10^{-7}$ | $9.33 \times 10^{-5}$ |
| 200 | $1.16 \times 10^{-10}$ | $1.36 \times 10^{-5}$ | $2.04 \times 10^{-3}$ |
| 300 | $2.72 \times 10^{-8}$ | $3.18 \times 10^{-4}$ | $1.61 \times 10^{-2}$ |
| 400 | $1.31 \times 10^{-6}$ | $3.01 \times 10^{-3}$ | $7.26 \times 10^{-2}$ |
| 500 | $2.36 \times 10^{-5}$ | $1.64 \times 10^{-2}$ | $2.29 \times 10^{-1}$ |
| 600 | $2.24 \times 10^{-4}$ | $6.24 \times 10^{-2}$ | $5.73 \times 10^{-1}$ |
| 700 | $1.36 \times 10^{-3}$ | $1.84 \times 10^{-1}$ | 1.25 |

In order to evaluate the expected signal from the combination of the optical fiber F and the detector DE it is necessary to assign values to the remaining parameters in equation 7 above. The most critical fiber parameter is the absorption constant, which is determined by maximizing the term $$F = (1 - e^{-\alpha l})e^{-\alpha l}$$

The result of this maximization is $$\alpha_m = -\frac{1}{l} \ln \frac{L}{L+l} \tag{8}$$

which is a relatively insensitive function of l and L over the range of values of interest for monitoring temperature in electrical machinery. Typical values for l and L are about 10 centimeters and 3 meters, respectively, which result in $\alpha_m = 3.28 \times 10^{-3} \text{cm}^{-1}$, or 1423 db/km, and $F = 1.21 \times 10^{-2}$.

The measured signal increases linearly with the cross-sectional area of the core CR of the fiber element F, so it is advantageous to use as large a diameter fiber F as possible. The largest diameter standard communications quartz fiber is 1 mm., corresponding to an area of $7.85 \times 10^{-3}$ cm.$^2$. For an air clad ($n_{clad}=1$), quartz core ($n_{core}=1.48$), having a critical angle $\theta_c$ of 42°, the calculated output signal power from the fiber F corresponds to:

$$P(T) = 3.08 \times 10^{-5} \int_{\lambda_o}^{\lambda_f} \frac{C_1}{\lambda^5} \left[ e^{\frac{C_2}{\lambda T}} - 1 \right]^{-1} d\lambda \text{ watts} \tag{9}$$

The minimum detectable temperature will be set by the noise equivalent power NEP of the particular detector used, and this will, in general, scale with the area of the detector DE. For optimized detection, the sensitive area of the detector DE should approximate the cross-sectional area of the core CR of the fiber F and be in direct contact so as to minimize transmittal losses. Table II below, shows the NEP for several 1 mm. diameter detectors operating at room temperature, and the minimum detectable temperatures for each as calculated in accordance with equation 9 above. Both lead sulfide and lead selenide photodiodes are capable of responding to temperatures below room temperature, but this would require the temperature of the surroundings to be at a significantly lower temperature in order not to mask the hot region HR.

TABLE II

MINIMUM DETECTABLE TEMPERATURES FOR SEVERAL TYPES OF DETECTORS WITH 1 MM² SENSITIVE AREA

| Type | λ cutoff (μm) | NEP (W/Hz$^{\frac{1}{2}}$) | Minimum Detectable Temperature |
|---|---|---|---|
| Silicon | 1.0 | $5 \times 10^{-14}$ | 240° C. |
| Germanium | 1.8 | $10^{-12}$ | 80° C. |
| Lead Sulfide | 2.9 | $10^{-11}$ | <room temp. |
| Lead Selenide | 4.5 | $10^{-10}$ | <room temp. |

The choice of a loss constant α to optimize response of the fiber F for any particular application will depend upon the expected range of values of l, L and T. Operation at high temperatures, i.e., in excess of 300° C., can be readily implemented with relatively low loss fibers because the value of the planck integral is large. For low temperatures, i.e., below 300° C., α must be chosen more carefully. A summary of the values of the function F (α, l, L) is shown in FIG. 2 which is a plot of signal variation with absorption, or loss, constant α for several values of L, and a hot region HR having a length of 10 cm. It is noted from FIG. 2 that for α values approaching about $10^{-2}$cm$^{-1}$, F is a fairly linear function of l, for l values up to about 50 cm. These curves illustrate that for a range of L from about 1 meter to 5 meters, the optimum α is about $3 \times 10^{-3}$cm$^{-1}$ (or about 1000 db/km). This corresponds to a very lossy communications fiber; the loss constant of low loss fiber typically lies in the range of about 1 to 10 db/km. For distances of less than one meter, greater sensitivity can be achieved by using fibers of even higher loss, i.e., $2 \times 10^{-2}$cm$^{-1}$. Quartz fiber of such high loss corresponds to that used in glass-blowing operations.

The optical signal from such a high loss fiber length HLF can be transmitted over a long distance by coupling the high loss fiber length HLF to a low loss fiber length LLF outside of the environmental region ER to be monitored via a suitable fiber coupler FC. This combined fiber length FL is schematically illustrated in FIG. 1B. An advantage of employing a fiber of a relatively small α is that the response is essentially independent of L as can be seen in FIG. 3. In this illustration, it is apparent that for $\alpha < 10^{-3}$cm$^{-1}$, F varies only a few percent between zero and 5 meters. Clearly, it may be advantageous to use the lower loss fiber if the temperatures are sufficiently high to produce an adequate signal so that variations of F and L can be ignored. A potential high temperature optical fiber material is sapphire. Low temperature applications can employ plastic fibers or chalcognide glasses, i.e., As$_2$S$_3$, which transmit into the far infrared.

If a fiber element F', as illustrated in FIG. 1 C, having a high value of loss constant and disposed adjacent to the object EM, is chosen to give high sensitivity, it is possible to determine the distance from the hot region HR, corresponding to a heated region of the object EM, to the end of the fiber element F' by making a measurement of the optical signal at both ends of the fiber element F'. Assuming the location of a hot region HR' at a distance L1 from one end of the fiber and a distance L2 from the other end of the fiber, the known fiber total length is L=L1+L2. The signals S1 and S2 measured by two identical detectors DE1 and DE2, respectively, located at either end of the fiber element F' are as follows:

$$S1 = e^{-\alpha L1}[1 - e^{-\alpha l}] (G) \text{ (planck integral)} \tag{10}$$

$$S2 = e^{-\alpha L2}[1 - e^{-\alpha l}] (G) \text{ (planck integral)}$$

where G contains the fiber geometry factors. From the ratio of the two signals S1 and S2

$$\frac{S1}{S2} = e^{-\alpha(L1-L2)} \tag{11}$$

the distance L1 is easily shown to be:

$$L1 = \frac{1}{2}L - \frac{1}{2\alpha} \ln\left(\frac{S1}{S2}\right) \tag{12}$$

Figure 4:
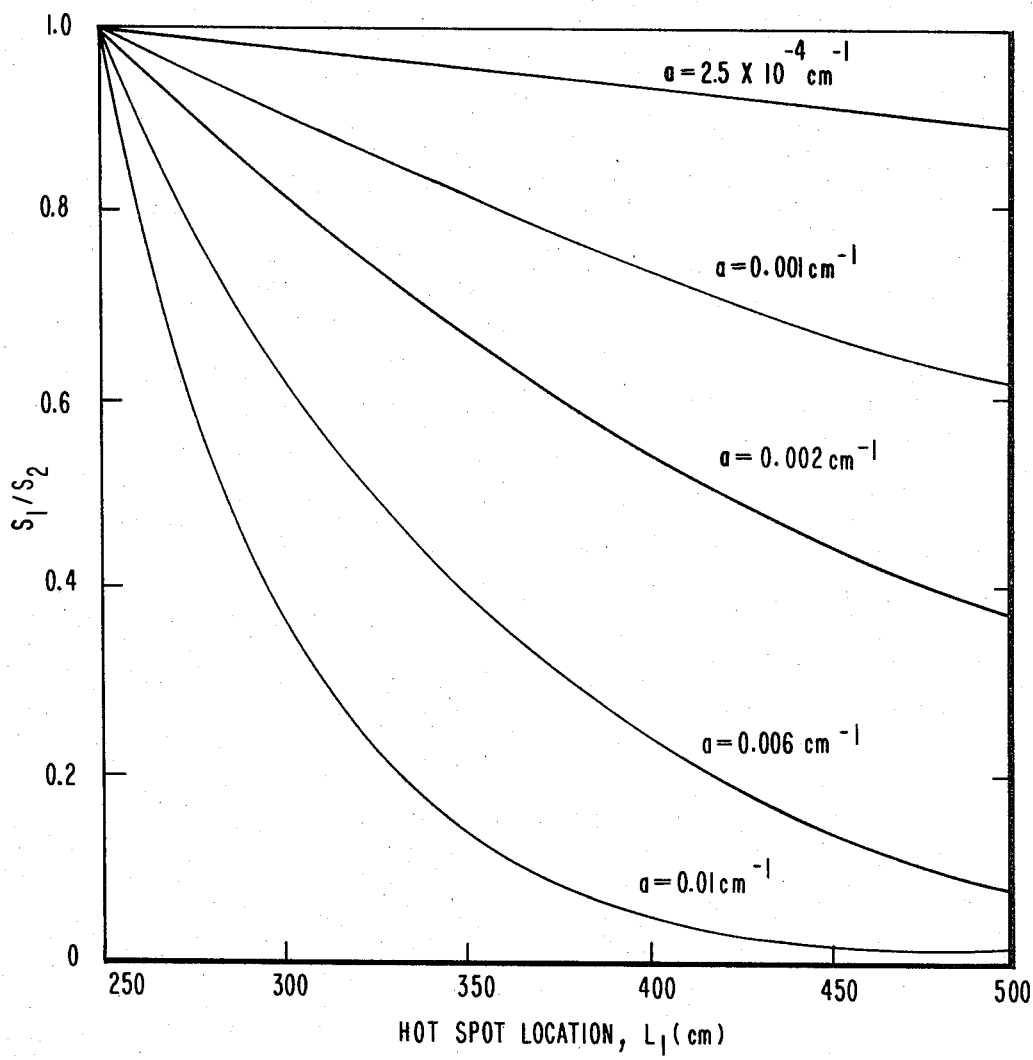

The ratio of equation (11) and the computation of the hot region location of equation (12) is readily accomplished by the microprocessor MP. Thus, if it is desired to know the location of a hot region HR' along a fiber element F', it will be advantageous to use a high loss fiber material in order to generate a large difference between the signals S1 and S2. The relationship between the signal ratio and the fiber loss constant for a 500 cm. long fiber element is illustrated in FIG. 4 for values of L1 ranging from L/2 to L.

Figure 5:
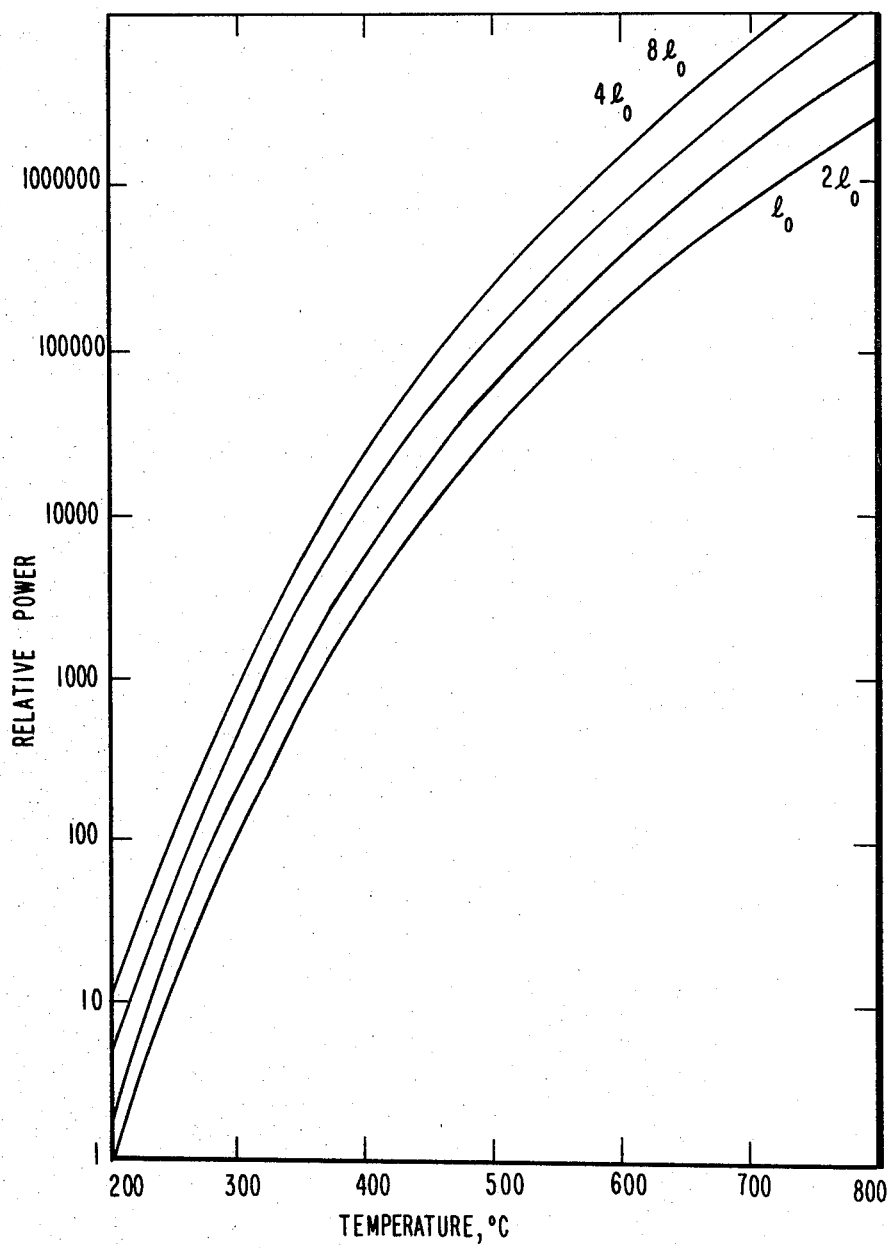

It is possible to make an estimate of the temperature, even with limited knowledge of the length l of the hot spot HR due to the fact that the radiated power increases exponentially with temperature, but only linearly with the length factor l. The relative radiated powers for hot spots having lengths ranging over a factor of 8 are shown in FIG. 5. For temperatures below 300° C., the uncertainty in temperature is about ±25° C., and this uncertainty increases with increasing temperature. If only an approximation of temperature is required, then a single indication of total power by the detector DE of FIG. 1A is adequate.

If a more accurate determination of temperature is required, and there is no established information as to the length l of the hot region, then a second detector measurement must also be made. The most straightforward method of eliminating the dependence on the hot region length l and the detector distance L is to measure the ratio of radiated power for two different values of long wavelength cut-offs, i.e., $\lambda_{f1}$ and $\lambda_{f2}$, in accordance with the following expression:

$$\frac{S(\lambda_{f2})}{S(\lambda_{f1})} = \frac{\int_{\lambda_{f1}}^{\lambda_{f2}} C_1/\lambda^5 \left[ e^{\frac{C_2}{\lambda T}} - 1 \right]^{-1} d\lambda}{\int_{\lambda_o}^{\lambda_{f1}} C_1/\lambda^5 \left[ e^{\frac{C_2}{\lambda T}} - 1 \right]^{-1} d\lambda} \quad (13)$$

Figure 6:
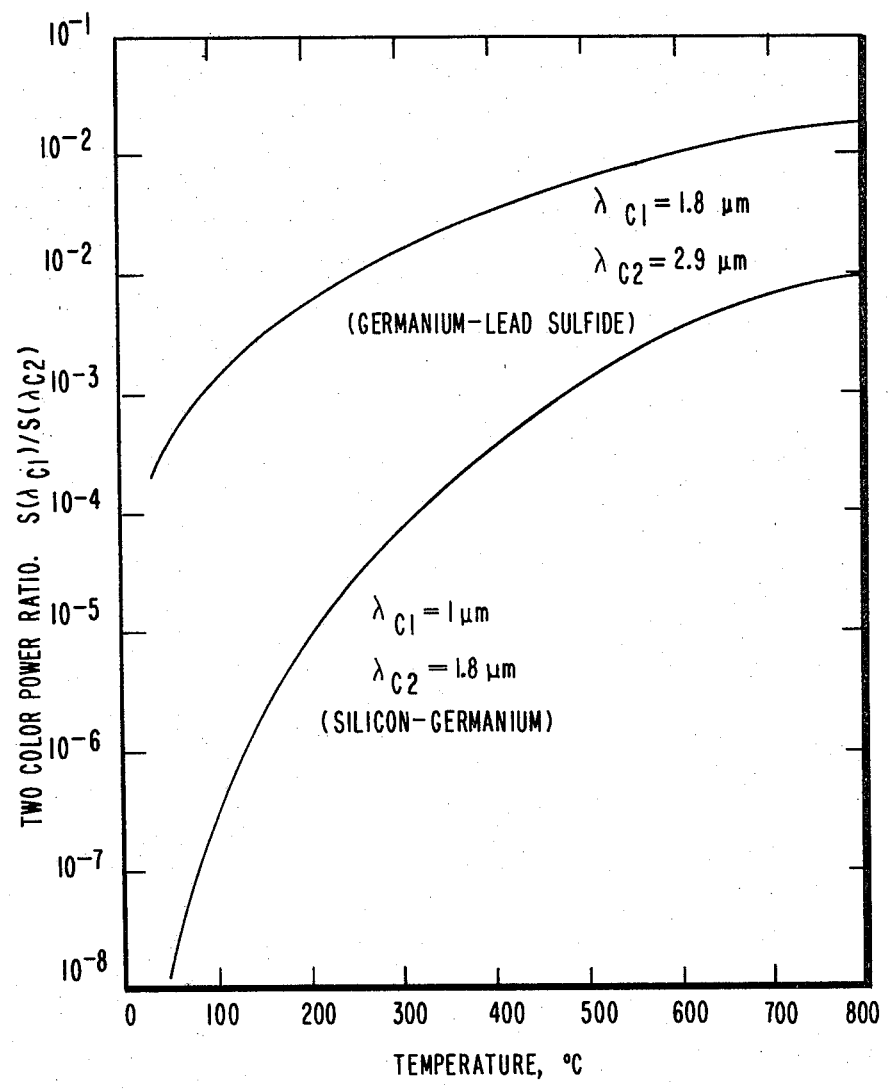

This measurement is accomplished through the use of a two element, or "two color", detector, such as that illustrated in FIG. 1D, which consists of a short wavelength cutoff detector DS, such as silicon, which detects essentially all thermal radiation up to approximately 1 micron, and a long wavelength cutoff detector DL, such as germanium, which detects the remaining radiation between approximately 1 micron and 1.8 microns. The selection of the various detector candidates for the two element combination is a matter of design preference. Any of those illustrated in Table II above can be packaged into a single detector unit. The dependence of the signal ratio at any temperature will depend upon the combination of detector elements employed. This ratio is shown in FIG. 6 as calculated from equation 13 above for a 1 micron and 1.8 micron pair of cut-off wavelengths, and for a 1.8 micron and 2.9 micron pair. These pairs correspond to a silicon-germanium dual element detector, and a germanium-lead sulfide dual element detector, respectively. These detectors are commercially available from Infrared Industries. It is evident from FIG. 6 that the actual value of the signal ratio will depend upon the sensitivity of each of the detectors, but the relative change with temperature is determined only by the black body radiation characteristics.

It is noted from Table II above that any two element, two wavelength, detector combination has the greatest sensitivity at lower temperatures, i.e., exhibits the greatest rate of change with respect to temperature.

In accordance with the above discussion, the silicon-germanium photodiode combination would be most suitable for temperatures above approximately 240° C., which corresponds to the minimum detectable temperature for silicon, while the germanium-lead sulfide combination can be used for temperatures in the range of about 80° C. to about 600° C., where the rate of change of signal ratio with temperature decreases rapidly. Various combinations of detector elements can be chosen to give high sensitivity within desired temperature ranges.

If the temperature has been determined by a two element measurement, and if the hot region location has also been determined by use of equation, 12 then it is possible to evaluate the length l of the hot region from a measurement of the signal power $P_1(\lambda_{f1})$ at one end of the fiber. The result is:

$$l = \frac{P_1(\lambda_{f1})}{\alpha \left( \frac{\pi D^2}{4} \right) \left( 1 - \frac{n_{clad}}{n_{core}} \right) e^{-\alpha L 1} \int_{\lambda_o}^{\lambda_{f1}} C_1/\lambda^5 \left[ e^{\frac{C_2}{\lambda T}} - 1 \right]^{-1} d\lambda} \quad (14)$$

OPERATIONAL EVALUATION

Figure 7:
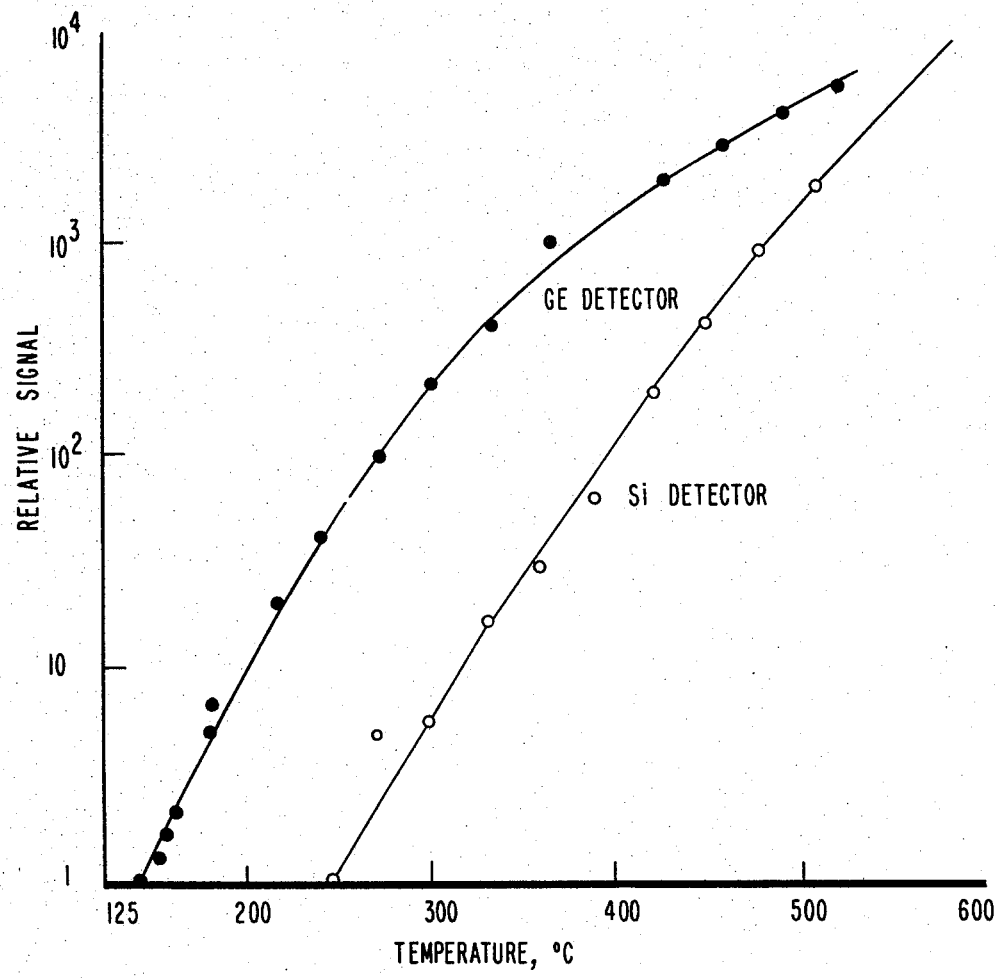

The practical implementation and operation of the fiber optic black-body radiation temperature sensor concept described above has been documented by measuring the optical signal produced by heating a 10 cm. section of moderate loss, 1 mm. diameter, standard communication optical fiber. The signal measurements for the optical fiber temperature sensing device TS were made with silicon and germanium photodiodes, operating in the photovoltaic mode, employing a microvoltmeter to measure the DC signal. The temperature response of the optical fiber element F, which for evaluation purposes consisted of a Quartz Products QSF-1000C fiber with an attenuation constant of 50 db-km, is graphically illustrated in FIG. 7. The minimum detectable temperature for this configuration is 125° C. This measurement limitation is the result of non-optimized coupling between the fiber element F and the detector DE, and further by the low value of the fiber loss constant.

It is clear from the above discussion that the basic concept disclosed and documented herein can be implemented through the use of various combinations of detectors and fiber compositions and configurations to satisfy temperature monitoring requirements over a predetermined temperature range beginning at temperatures approximating room temperature. The high temperature limit is generally set by the softening or melting point of the fiber material. If commonly available quartz fiber is used, this upper limit is approximately 1000° C.

In order to assure the operational integrity of a fiber, or fibers, of a temperature measuring configuration, it may be desirable to locate a light source LS, as shown in FIG. 1E, at one end of the fiber element F, with the detector DE located at the opposite end of the fiber element responding to the presence or absence of light to provide an indication of the operational integrity of the fiber. This light could be periodically pulsed so as not to interfere with the determination of a hot spot HR along the fiber F.

While the above discussion, for the purposes of simplicity, has been directed to an optical fiber temperature sensing device TS employing a single fiber, it is apparent that many fibers F1, F2 ... Fn can be joined at their ends and brought to a common detector, CD as illustrated in FIG. 1F so that only one detector is used to monitor many individual fiber elements. An optical signal multiplexing device SM can be applied if it is desired to monitor hot regions along the individual fibers.

We claim:

1. Apparatus for determining the presence of a hot region associated with an object, comprising,
    an elongated optical fiber element disposed in proximity to said object and within the temperature environment produced by said object, said optical fiber element responding to said temperature environment by self-generating thermal radiation within the optical fiber element, the wavelengths of the spectral composition of the self-generated thermal radiation varying along the length of said optical fiber length as a function of the variations in the temperature of the object along the length of the optical fiber element, the total radiation varying exponentially with temperature such that the spectral composition of the self-generated thermal radiation transmitted to an end of the optical fiber element is determined substantially by the highest temperature region along the optical fiber element, and
    a thermal radiation detector means operatively coupled to an end of said elongated optical fiber element to provide an indication of the hottest region of said object.

2. Apparatus as claimed in claim 1 wherein the material composition of the optical fiber element is selected on the basis of an absorption constant which will optimize the self-generating thermal radiation characteristic of the optical fiber element in a preferred temperature range.

3. Apparatus for determining the presence and temperature of a hot region associated with an object, comprising,
    an elongated optical fiber element disposed in proximity to said object and within the temperature environment produced by said object, said optical fiber element responding to said temperature environment by self-generating thermal radiation within the optical fiber element, the wavelengths of the spectral composition of the self-generated thermal radiation varying along the length of said elongated optical fiber element as a function of the variation in the temperature of the object along the length of the elongated optical fiber element, the total thermal radiation at all wavelengths increases exponentially with increasing temperature such that the spectral composition of the thermal radiation transmitted within the optical fiber element is essentially determined by the temperature of the hottest region of said object,
    detector means operatively coupled to an end of said elongated optical fiber element and responding to said transmitted thermal radiation by identifying the presence of a hot region, said detector means including a first detector having a short wavelength cutoff responding to said thermal radiation by generating a first output signal and a second detector having a long wavelength cutoff responding to said thermal radiation by generating a second output signal, and a means for taking the ratio of said first and second output signals as an indication of the temperature of the hot region.

4. Apparatus for determining the presence of a hot region associated with an object, comprising,
    an elongated optical fiber element disposed in proximity to said object and within the temperature environment produced by said object, said optical fiber element responding to said temperature environment by self-generating thermal radiation within the optical fiber element, the wavelengths of the spectral composition of the self-generated thermal radiation varying along the length of said optical fiber length as a function of the variations in the temperature of the object along the length of the optical fiber element, the total radiation varying exponentially with temperature such that the spectral composition of the self-generated thermal radiation transmitted to the ends of the optical fiber element is determined substantially by the highest temperature region along the optical fiber element, and
    a first and second thermal radiation detector means operatively coupled to either end of said elongated optical fiber element for converting the self-generated thermal radiation transmitted to either end into a first and second output signal respectively, and
    means for taking the ratio of said first and second output signals and developing an indication of the location of the hot region of said object along said elongated optical fiber element.

5. Apparatus for determining the presence of a hot region associated with an object, comprising,
    an elongated high loss optical fiber element disposed in proximity to said object and within the temperature environment produced by said object, said optical fiber element responding to said temperature environment by self-generating thermal radiation within the optical fiber element, the wavelengths of the spectral composition of the self-generated thermal radiation varying along the length of said optical fiber length as a function of the variations in the temperature of the object along the length of the optical fiber element, the total radiation varying exponentially with temperature such that the spectral composition of the self-generated thermal radiation transmitted to an end of the optical fiber element is determined substantially by the highest temperature region along the optical fiber element,
    an elongated low loss optical fiber element having one end optically coupled to an end of said elongated high loss optical fiber element and extending beyond the temperature environment produced by said object, and
    means operatively connected to the opposite end of said elongated low loss optical fiber element and responding to said self-generated thermal radiation of said elongated high loss optical fiber element and transmitted by said elongated low loss optical fiber by providing an indication of the hottest region of said object.

6. Apparatus for determining the presence of a hot region associated with an object, comprising, an elongated optical fiber element disposed in proximity to said object and within the temperature environment produced by said object, said optical fiber element responding to said temperature environment by self-generating thermal radiation within the optical fiber element, the wavelengths of the spectral composition of the self-generated thermal radiation varying along the length of said optical fiber length as a function of the variations in the temperature of the object along the length of the optical fiber element, the total radiation varying exponentially with temperature such that the total power of the self-generated thermal radiation transmitted to an end of the optical fiber element is determined substantially by the highest temperature region along the optical fiber element, and means operatively coupled to an end of said elongated optical fiber element to respond to said total power of the self generated thermal radiation transmitted to said end by providing an indication of the temperature of the hottest region of said object.

7. Apparatus for determining the presence of a hot region associated with an object, comprising, an elongated optical fiber element disposed in proximity to said object and within the temperature environment produced by said object, said optical fiber element responding to said temperature environment by self-generating thermal radiation within the optical fiber element, the wavelengths of the spectral composition of the self-generated thermal radiation varying along the length of said optical fiber length as a function of the variations in the temperature of the object along the length of the optical fiber element, the total radiation varying exponentially with temperature such that the spectral composition of the self-generated thermal radiation transmitted to an end of the optical fiber element is determined substantially by the highest temperature region along the optical fiber element, a thermal radiation detector means operatively coupled to an end of said elongated optical fiber element to provide an indication of the hottest region of said object, and means for monitoring the operational integrity of said elongated optical fiber element in combination with said detector means, said means for monitoring the operational integrity including a periodically activated radiation source operatively coupled to the end of said elongated optical fiber element opposite said detector means, said means for monitoring the operational integrity periodically introducing a radiation energy input signal into said elongated optical fiber element for transmission through said fiber element for detection by said detector means.

* * * * *